United States Patent [19]

Littlefield

[11] Patent Number: 4,524,245
[45] Date of Patent: Jun. 18, 1985

[54] RING TRIP DETECTION SYSTEM

[75] Inventor: Bruce G. Littlefield, Honeoye Falls, N.Y.

[73] Assignee: Redcom Laboratories Inc., Fairport, N.Y.

[21] Appl. No.: 457,556

[22] Filed: Jan. 13, 1983

[51] Int. Cl.³ .................................................. H04M 3/02
[52] U.S. Cl. .................................................. 179/18 HB
[58] Field of Search ................. 179/18 HB;84 A, 84 R

[56] References Cited

U.S. PATENT DOCUMENTS

| 4,022,980 | 5/1977 | Kitajewski et al. | 179/18 HB |
| 4,356,355 | 10/1982 | Ferrieu et al. | 179/18 HB |
| 4,362,908 | 12/1982 | Melindo | 179/18 HB |
| 4,447,675 | 5/1984 | Arntsen et al. | 179/84 R |

*Primary Examiner*—Thomas W. Brown
*Attorney, Agent, or Firm*—Martin LuKacher

[57] ABSTRACT

Ring trip is detected when a telephone set which is being rung goes off-hook, through the use of a comparator in which the ringing signal superimposed on battery feed voltage is compared with a fixed reference voltage closer to ground than the battery feed voltage. Inasmuch as the duty cycle of the ringing signal with respect to the reference voltage is less than or equal to 50% under pre-trip (on-hook) conditions and will increase under trip (off-hook) conditions, the comparator output is a square wave form of corresponding duty cycle. An up-down counter is caused to count up when the comparator output wave form is of one level and down when the comparator output wave form is of another level during each cycle of the ringing signal. The counter counts up during the portion of the comparator wave form which determines the duty cycle and down during the rest of the period of the cycle. Underflow and lack of underflow states of the counter respectively indicate nonring trip and ring trip conditions. Logic responsive to these conditions causes deactuation of a ringing relay to enable disconnection of the ringing signal from the ring lead going from the line circuit to the telephone set. The line circuit has a calling bridge which provides an output which is used to prevent the ringing relay from reoperating unless the telephone set remains on-hook after ring trip detection.

18 Claims, 4 Drawing Figures

RING TRIP DETECTION SYSTEM

DESCRIPTION

The present invention relates to telephony, and particularly to a ring trip detection system which controls the application of ringing signals to the ringers of telephone sets, causing the disconnection of the ringing signals when the telephone set to which ringing is applied goes off-hook.

A ring trip detection system provided by the invention is especially adapted for use in the ground/loop start line interface of a telephone system where a telephone set or sets is connected to a line circuit via the ring and tip leads of the loop.

Every automatic telephone system has a ring trip detection circuit which causes the ringing signal generator to be disconnected from the telephone set when the set goes off-hook. There are circuits which respond to the change in duty cycle of the ringing current which use a differential relay. The relay makes and breaks contacts over different intervals when the telephone set is on-hook during ringing and when it goes off-hook. A problem in ring trip detection which is prevalent with known circuits is that they are application dependent in that they are designed for a specific application, such as where a specific ringing frequency or specific voltage levels are used. Ringing frequencies may range from fifteen to seventy Hertz (Hz). In party line systems several ringing frequencies may be used, each for a different party on the line. Filters have been used to accommodate different ringing frequencies and some frequency variation. The use of such filters makes the ring trip detection circuit in which the filters are included application dependent. Further disadvantage may arise in that the filters increase the time required for a ring trip to be detected.

In practical telephone systems the voltages which are applied to the loop (e.g., the battery feed voltage) may vary at the point where such voltages are tapped for ring trip detection purposes. The voltages vary with the length of the loop, the number of telephone sets in the loop as well as with environmental effects. Both the battery feed and the ringing signal voltages thus may vary in different applications. These voltages also vary with transients which may be picked up on the loop. In prior ring trip detection systems which depend on the change in duty cycle of the ringing signal, such voltage variations, especially when variable with the loop length and telephone sets connected in the loop—load dependence—may result in erroneous ring trip detection. Erroneous ring trip detection may also be caused by leakage resistance between the tip and ring leads. In some prior art systems the problem is exacerbated by the use of voltages for ring trip detection purposes tapped from the return path (tip lead), after voltage drop in the loop has occurred. The above mentioned ring trip system also could not be used in certain party-line applications using ground connected ringers which would bypass the detection means. Changes in ringing frequency may also cause erroneous ring trips.

It is a feature of the present invention to provide an improved ring trip detection system which is adapted for use in many telephone systems and is not application dependent. The detection system provided by the invention has a further feature of being responsive to ring trip conditions regardless of the frequency of the ringing signal, whether the ringing signal be 15 Hz, 70 Hz or inbetween these frequencies. Another feature of the invention is to provide reoperation of the ringing relay to reconnect the ringing signal to the telephone sets even if a ring trip is detected should there not be a true off-hook condition. In the event of a ringing circuit failure, the ringing generator may short to ground (a ring short condition). It is a feature of the ring trip detection system provided by the invention to disconnect the ringing generator from ground, if a ring short condition occurs; thus reducing the possibility of permanent damage to an expensive telephone system component. In a ring trip detection system provided by the invention, the ringing supply (ring lead) is tapped for sensing voltages for ring trip detection purposes, rather than the return path (tip lead) where the voltage sensed may be load dependent.

It is the object of the present invention to provide an improved ring trip detection system in which the aforementioned deficiencies of prior ring trip detection techniques are substantially obviated and the features stated above are obtained.

Briefly described, a ring trip detection system embodying the invention is operative to detect a ring trip condition when the telephone set having a ringer to which ringing signals are applied goes off-hook. The system uses an up-down counter. Means responsive to the duty cycle of the ringing signals with respect to a reference voltage level condition the counter into an underflow state when the duty cycle does not exceed 50%. The duty cycle of the signal is the ratio of the duration of the signal when it is of one polarity with respect to the reference voltage level to the period of an entire cycle of the signal. A 50% duty cycle thus defines a signal having portions of equal duration during a cycle above and below the reference level. Preferably, a system embodying the invention utilizes a comparator to which the ringing signal which is superimposed on battery feed voltage is applied to one input and a reference voltage to the other input. Inasmuch as the battery feed voltage is attenuated upon occurrence of an off-hook condition, the duty cycle of the ringing signal with respect to the reference voltage is always equal to or less than 50% when the telephone set is on-hook (there being no drops in voltage due to the resistance of the receiver and transmitter of the telephone set). When the telephone set goes off-hook the drops shift the d.c. voltage level of the ringing signal, and therefore duty cycle of the ringing signal with respect to the reference voltage is always greater than 50%. The output of the comparator has a duty cycle corresponding to the duty cycle of the ringing signal with respect to the reference voltage and may be used to control up and down counting in the counter. By resetting the counter at the beginning of each cycle of the ringing signal, an underflow condition must occur when the duty cycle is equal to or less than 50%, but cannot occur if the duty cycle is greater than 50%. Means responsive to the absence of the underflow state of the counter provides the ring trip detection output. This output may be used to control the connection of the ring generator to the telephone set ringers, for example, by deactuation of a ringing relay.

The foregoing and other objects, features and advantages of the invention as well as a presently preferred embodiment thereof, will become more apparent from a reading of the following description in connection with the accompanying drawings in which.

Figure 1:
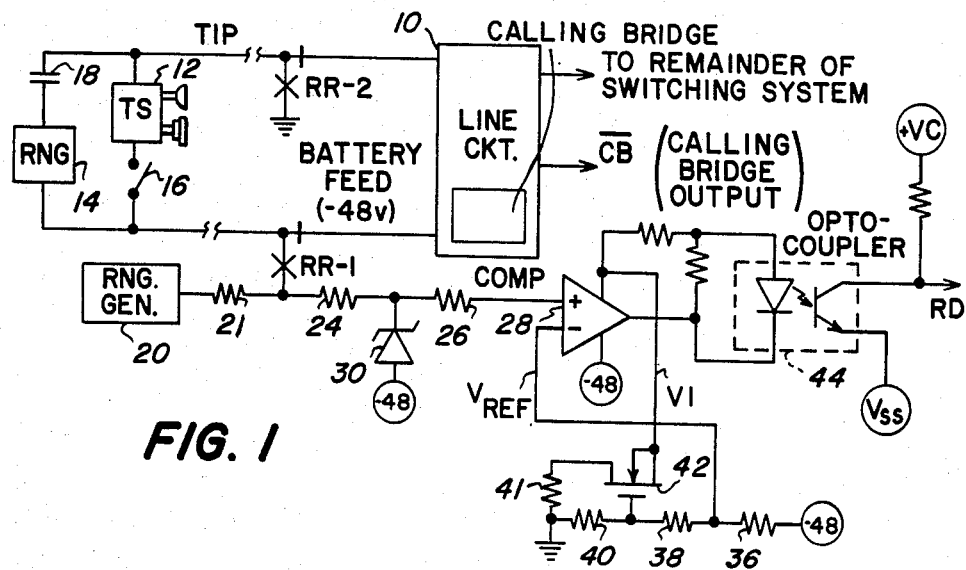
FIG. 1 is a schematic diagram of the portion of the ring trip detection system provided in accordance with a presently preferred embodiment of the invention which senses the duty cycle of the ringing signal with respect to a fixed reference voltage and provides an output corresponding thereto.
Figure 2:
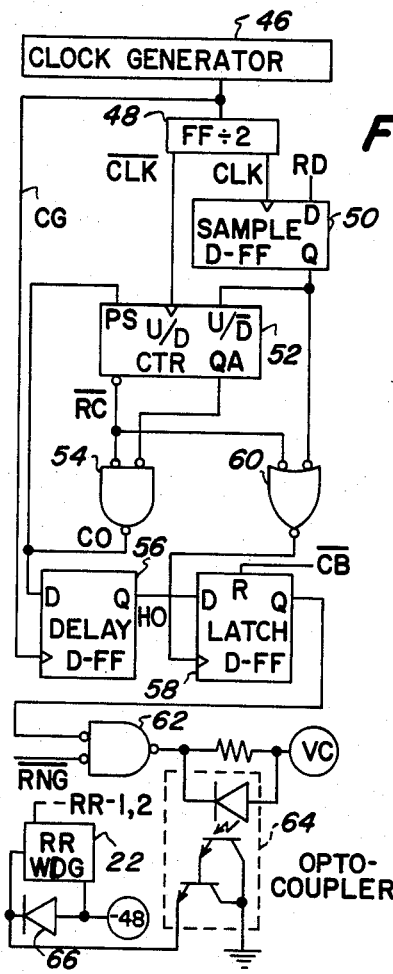
FIG. 2 is a block diagram illustrating the portion of the system which responds to the output provided by the system portion illustrated in FIG. 1 and detects ring trip conditions to enable disconnection of a ringing generator from the loop.
Figure 3:
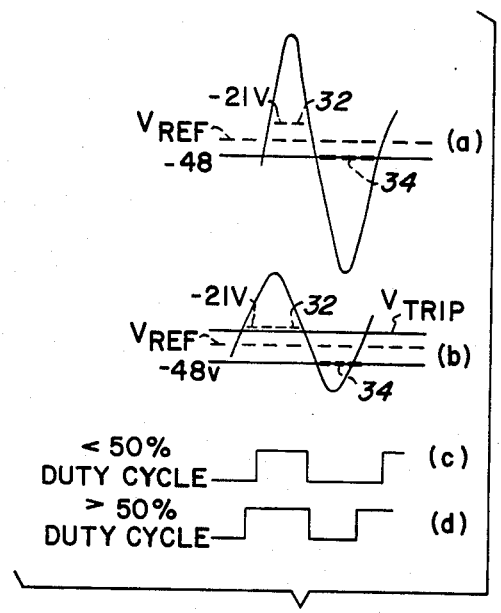
FIG. 3 is a wave form diagram which is explanatory of the operation of the portion of the system shown in FIG. 1.

Referring to FIGS. 1 and 3 there is shown a line circuit 10 with its ground/loop start line interface to a telephone set (TS) having a receiver and transmitter 12 and a ringer (RNG) 14. A hook switch 16 is shown open in the on-hook condition of the telephone set. The ringer is connected with the telephone set and its hook switch through a capacitor 18 across the ring (ringing supply) and tip (return) leads of the loop. Battery feed voltage (−48 volts) is applied to the ring lead via the line circuit 10. A ringing generator 20 is connected to the ring lead by way of a resistor 21. C-form contacts RR-1 and RR-2 connect the ringing generator 20 and ground (GND) to the ring and tip leads, respectively. These contacts also connect the ring and tip leads to the line circuit. The contacts to the line circuit 10 are normally made or closed when the ringing relay is not actuated. When the ringing relay is actuated, the normally open or broken leads connect the ringing generator 20 and ground to the ring and tip leads. The winding of the ringing relay (RR WDG) 22 is operated depending upon ring trip detection by the portion of the system shown in FIG. 2.

The line circuit includes a calling bridge which provides an output (CB) to the switching logic of the telephone system in the presence of direct current flow through the loop, as occurs when the telephone set 12 is off-hook, when the normally closed contacts of the ringing relay connect the tip and ring leads to the line circuit. This calling bridge output is also used to prevent reoperation of the ringing relay in the event that a ring trip is detected, unless the telephone set 12 is on-hook. The voltage across the resistor 21 with the telephone set 12 on-hook is shown in FIG. 3, wave form (a). The ringing signal is essentially sinusoidal with its base line at the battery feed voltage, −48 volts. When the telephone set 12 goes off-hook, the drop in the voltage across the resistance 21 presented by the transmitter and receiver to the direct current therethrough, which does not pass through the ringer circuit due to the capacitor 18, increases (closer to ground). Depending upon the loop resistance, which may vary, for example, from 100 to 2400 OHMS, the base line of the ringing signal, which is also attenuated due to the load, may, for example, drop from −48 to −24 volts, as shown in wave form (b) of FIG. 3.

This ringing signal is applied via resistors 24 and 26 to an input of a comparator 28. A zener diode 30 is connected in parallel with the ringing generator and biased at the battery feed voltage (−48 volts). Suitably the breakdown voltage of this zener diode is 27 volts so as to protect the input circuits of the comparator 28. In effect, the zener diode 30 clamps the ringing signal within a 27 volt range as indicated by the dash horizontal lines 32 and 34 in wave forms (a) and (b) of FIG. 3. The comparator responds to the crossings of the ringing signal at the reference voltage level ($V_{REF}$). Accordingly, the clamping of the input signal to the comparator by the zener diode 30 does not affect response of the comparator to the duty cycle of the ringing signal with respect to the reference voltage level.

The reference voltage is derived from the −48 volt supply by a voltage divider network including three resistors 36, 38 and 40 connected between −48 volts and ground. A source follower field effect transistor 42, connected between the junction of the divider resistors 38 and 40 and to ground via another resistor 41, provides operating voltage for the comparator from the −48 volts supply. The reference voltage and the supply voltage to the comparator thus vary with supply voltage and compensate for supply voltage variations.

The output of the comparator 28 is coupled through an optical coupler 44 to provide the ring detect (RD) output. The current flows through the light emitting diode of the optical coupler when the comparator output is low, and the RD output is taken across the collector resistor of the phototransistor in the optical coupler. Accordingly, the RD output is a square wave form having the duty cycle of the ringing signal with respect to the reference voltage. The RD wave form is shown in FIG. 4.

It will be noted that the reference voltage is closer to ground than the battery feed voltage as shown in wave forms (a) and (b) of FIG. 3. When the ringing signal crosses the reference voltage base line in a positive direction, the comparator output voltage goes high. Conversely, upon crossing the reference voltage base line in the negative direction, the comparator output goes low. Inasmuch as the battery feed voltage as detected across the resistor 21 drops when the telephone set 12 goes off-hook (the hook switch 16 then closing), the duty cycle of the ringing signal with respect to the reference voltage level is equal to or less than 50% during on-hook conditions and must be greater than 50% when the telephone set goes off-hook. The ring detect wave form for less than 50% duty cycle in the on-hook case shown in wave form (a) of FIG. 3 is illustrated in wave form (c) of FIG. 3, while the greater than 50% duty cycle for the off-hook case shown in wave form (b) is illustrated in wave form (d) of FIG. 3.

It will be noted that the sensing circuit provided by the comparator is connected directly to the ring lead so that it is not adversely affected by different loadings due to different loop lengths. The reference voltage is selected considering any effects caused by leakage resistance across the loop. Accordingly, it should be as close to battery feed voltage as practicable to detect the duty cycle variations. The resistors 36, 38 and 40 in the reference voltage supply circuit are also desirably precision resistors.

Figure 4:
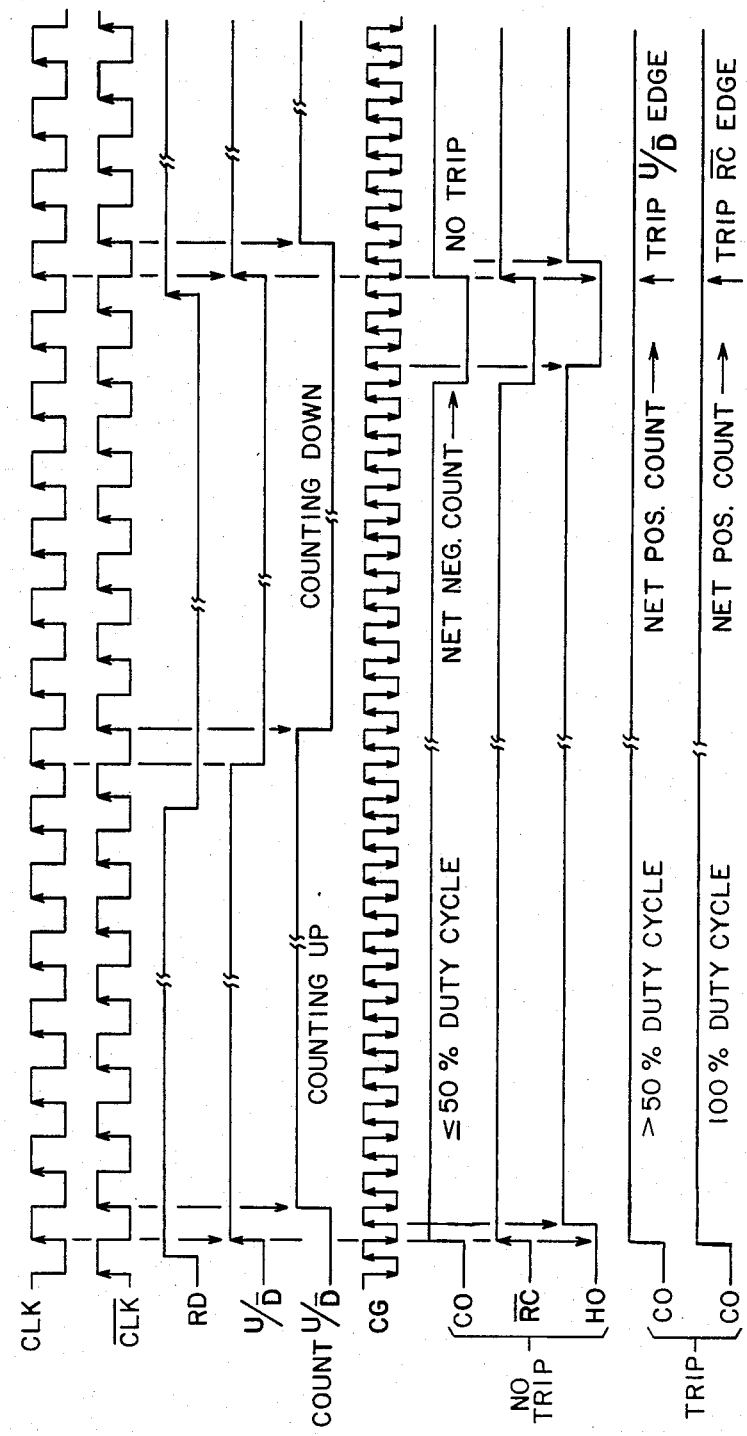
FIG. 4 is a wave form diagram explanatory of the portion of the system shown in FIG. 2.

Referring more particularly to FIGS. 2 and 4, there is shown a clock generator 46 which may be an oscillator providing a train of pulses (CG). In a system suitable for ring trip detection, with ringing signals from 15 Hz to 70 Hz, the CG pulses may be at a 14 KHz rate. These pulses are divided by two in a flip-flop 48 to provide complementary clock pulse trains (CLK) and ($\overline{CLK}$). The CLK pulses are used to sample and reclock the RD output in a D-type flip-flop 50. This reclocking synchronizes operation of the system to the CLK pulses. The output of the flip-flop is the up-down control level for an up-down counter 52. The counter may be implemented by a pair of 4-bit counters. The ripple carry output of the first counter is connected to the enable input of the second such that when the first counter overflows, the second counter begins counting in the direction determined by the level of the reclocked RD output which is applied to its U/$\overline{\text{D}}$ input. The up-down counter 52 is shown as a single counter for purposes of simplifying the illustration. The up-down counter 52 counts the $\overline{\text{CLK}}$ pulses which will be at a rate of 7 KHz when the clock generator pulses are at 14 KHz. The use of two counters provides an 8-bit counter which is capable of counting 512 bits per ringing signal cycle. This capacity is selected giving consideration for the resolution of timing to effect the ring trip detection operation and also for the lowest ringing frequency which is expected to be encountered. An 8-bit counter in conjunction with a clock frequency of 7 KHz has been found suitable for use, even with low ringing frequencies of 15 Hz. The CG, CLK and $\overline{\text{CLK}}$ pulses, the RD level, the U/$\overline{\text{D}}$ level from the reclocking flip-flop 50 and the counting periods in the up and down direction (count U/$\overline{\text{D}}$) are all illustrated in FIG. 4.

The duty cycle of the ringing signal with respect to the reference as represented by the RD output causes the counter 52 to overflow in the negative direction if the duty cycle is equal to or less than 50%. Then the ripple carry ($\overline{\text{RC}}$) output of the counter and the lower order bit, QA, thereof will be low representing the presence of an overflow condition in the negative direction or a net negative count. This condition is detected by logic including a count out gate 54. This gate 54 is an OR gate illustrated as a negative logic AND gate to denote its function. The CO output will be low at the end of the ringing cycle and will go high when the next $\overline{\text{CLK}}$ pulse reaches the input of the counter 52; the U/$\overline{\text{D}}$ input already having gone high upon the next cycle of the ringing signal. The $\overline{\text{RC}}$ output goes high immediately upon the up/$\overline{\text{down}}$ going high at the onset of the next ringing signal cycle. To prevent race conditions in the system, another D flip-flop 56 is included in the logic to delay the CO output ½ cycle of the CG clock rate.

The delayed CO output is indicated at HO. This output is stored in a ring trip latch flip-flop 58 which is also a D flip-flop. This flip-flop is clocked by an AND Gate 60, illustrated as a negative logic OR gate to denote its function. On the occurrence of the positive going edges of the U/$\overline{\text{D}}$ and $\overline{\text{RC}}$ outputs, the ring trip latch 58 will be clocked. The HO output is then low (see FIG. 4). Accordingly, a low output is applied to an OR gate 62, illustrated as a negative logic AND gate to denote is function. Inasmuch as ringing is still commanded by the telephone system, the $\overline{\text{RNG}}$ signal which is applied to an input of that OR gate 62 is also low. An optical coupler 64 then works in its illuminated condition, since current flow through the light emitting diode thereof is permitted. Current then flows through the emitter follower connected transistors of the coupler 64 through the ringing relay winding 22. The ringing relay then remains actuated; there being no ring trip detection. Ring trip is detected when there is a net positive count (no negative overflow) in the up-down counter 52. Then the delay flip-flop 56 HO output will be high. At the onset of the next ringing cycle, the ring trip latch flip-flop 58 will be clocked to place a high on its Q output. The output of the OR gate 62 is then high and the light emitting diode of the opto coupler 64 is cut off, causing current flow through the ringing relay winding 22 to be cut off. Upon de-actuation of ringing relay contacts RR-1 and RR-2, the tip and ring leads are returned to the line circuit 10. An off-hook condition on tip and ring causes the calling bridge output of the line circuit ($\overline{\text{CB}}$) to go to the off-hook state, causing the ring trip latch 58 to remain in the tripped condition.

In the event that the telephone set 12 has remained on-hook, the calling bridge output from the line circuit 10 (FIG. 1), indicated as $\overline{\text{CB}}$, will allow the ring trip latch flip-flop 58 to be reset upon the start of the succeeding ringing signal cycle. Then the output of the AND gate 62 returns to the low state causing operating current to again flow through the ring relay operating winding 22 to reoperate the ring relay. When the telephone system turns off ringing, the $\overline{\text{RNG}}$ command to the OR gate 62 will go high. The telephone system thus controls ringing and the disconnection of ringing in accordance with its normal operation to signal the telephone set 12 of incoming calls.

Should the count overflow in the positive direction for any reason, such as a ring short to ground, a net positive count will occur. This positive count will be clocked into the ring trip latch 58 by the high edge of $\overline{\text{RC}}$, be treated just like a ring trip detection and cause current flow through the ringing relay winding 22 to be cut off. Accordingly, damage to the ring generator is obviated. The ringing relay winding is bridged by a diode 66 which protects the winding against reverse currents.

From the foregoing description it will be apparent that there has been provided an improved ring trip detection system. A preferred embodiment of the system has been described herein to illustrate the invention. Variations and modifications in the herein described embodiment, within the scope of the invention, will undoubtedly suggest themselves to those skilled in the art. Accordingly, the foregoing description should be taken as illustrative and not in a limiting sense.

I claim:

1. A ring trip detection system for detecting a ring trip condition when a telephone set having a ringer to which ringing signals are applied goes off-hook which comprises an up-down counter, means responsive to the duty cycle of said ringing signals with respect to a reference voltage level to condition said counter into an underflow state when said duty cycle does not exceed 50%, and means operative upon absence or occurrence of said underflow state for providing an output indicative of the presence or absence of a ring trip.

2. The system according to claim 1 further comprising means responsive to said ring trip output for controlling the removal of said ringing signals from said ringer.

3. The system according to claim 1 further comprising means for generating clock signals having a repetition rate much higher than the frequency of said ringing signals, and means for applying said clock signals for counting to said counter, said counter having a capacity to count a multiplicity of said clock signals during each cycle of said ringing signals.

4. The system according to claim 3 wherein said ringing signals in superposition with battery feed voltage are applied to said telephone set via ring and tip leads across which said telephone set is connected, said duty cycle responsive means comprises a comparator having two inputs, means for applying a fixed reference voltage to one input of said comparator, means for applying said ringing signals with said battery feed voltage superimposed thereon to the other input of said comparator, means for deriving a bi-level wave form having a duty cycle corresponding to the duty cycle of said ringing signal with respect to said reference voltage, and means for applying said bi-level wave form to said up-down counter to cause said counter to count said clock signals in an upward direction when said bi-level wave form is of one of its levels and to count down when said bi-level wave form is of the other of its said levels.

5. The system according to claim 4 further comprising means for supplying said reference voltage and supply voltage for operating said comparator from a common voltage source whereby to compensate for variations in voltage of said source.

6. The system according to claim 4 wherein said reference voltage is of a level between ground and the level of the battery feed voltage.

7. The system according to claim 4 wherein ringing signals are applied to said ring lead via a resistor, said system further including a ringing relay having contacts for connecting said resistor to said ring lead and other contacts for connecting said ring lead to a line circuit to which said ring and tip leads are connected, and means for connecting said other input of said comparator to said ring lead through said first named contacts of said ringing relay.

8. The system according to claim 7 wherein said means for connecting said other input of said comparator to said ring lead comprises a zener diode, means connecting said zener diode in parallel with said resistor, said zener diode having a breakdown voltage level between the level of said reference voltage and ground, and means for biasing said zener diode to conduct at a voltage approximately equal to said battery feed voltage.

9. The system according to claim 7 wherein said line circuit includes a calling bridge for providing an output when said telephone set goes off-hook, and means responsive to the presence of said calling bridge output for overriding said ring trip detection output and disabling reactuation of said ringing relay.

10. The system according to claim 7 wherein said means for providing said ring trip detection output comprises a latch, means for setting said latch in response to said ring trip detection output to store said output, means operated by said output stored in said latch for rendering said ringing relay unactuated, and means operated by said line circuit for preventing said latch from returning to the condition where said ring trip detection output is absent.

11. The system according to claim 10 wherein said means for providing said ring trip detection output comprises means for allowing said latch to return to the condition in which said ring trip detection output is absent to reactuate said ringing relay and reapply said ringing signals to said telephone set should the telephone set remain on hook after ring trip detection.

12. A ring trip detection system for controlling the application of ringing signals which are superimposed on battery feed voltage to the ringer of a telephone set by way of a loop including ring and return leads, which system comprises a comparator having two inputs and an output, means for applying said ringing signals superimposed upon said battery feed voltage to one of said inputs, means for applying a reference voltage to the other of said inputs, said reference voltage being a fixed voltage level between said battery feed voltage and ground, and means responsive to the duty cycle of output signals from said comparator output for controlling the application of said ringing signals to said ring lead.

13. The system according to claim 12 wherein said duty cycle responsive means includes means for providing a ring trip output for disconnecting said ringing signals when said duty cycle exceeds 50% and for providing an output for connecting said ringing signals when said duty cycle is equal or less than 50%.

14. The system according to claim 13 wherein said duty cycle responsive means comprises an up-down counter for providing said ring trip output, and means for applying said comparator output to said counter to enable said counter to count up and down during periods of time varying in accordance with the duty cycle of said ringing signals with respect to said fixed reference voltage.

15. The system according to claim 14 wherein said counter has a ripple carry output, and means responsive to said ripple carry output for providing said ring trip output, said last-named means including a latch for storing said ring trip output.

16. The system according to claim 15 further comprising means responsive to current flow through said loop when said telephone set goes off-hook for resetting said latch when said current flow is absent.

17. The system according to claim 14 comprising means connecting said one input of said comparator directly to said ringing lead.

18. The system according to claim 16 further comprising a ringing generator supplying said ringing signals, a line circuit, a ringing relay having contacts connecting and disconnecting said ringing generator to said ringing lead, said ringing lead to said line circuit, said return lead to ground and said return lead to said line circuit, and means for actuating and deactuating said ringing relay in response to said ring trip output.

* * * * *